US012705734B2

(12) United States Patent
Menys et al.

(10) Patent No.: US 12,705,734 B2
(45) Date of Patent: Aug. 11, 2026

(54) SYSTEM TO CHARACTERIZE TOPOLOGY AND MORPHOLOGY OF FISTULAE FROM MEDICAL IMAGING DATA

(71) Applicant: MOTILENT LIMITED, London (GB)

(72) Inventors: Alexander Menys, London (GB); Liam Carter, London (GB); Thomas Robbins, London (GB); Gauraang Bhatnagar, London (GB)

(73) Assignee: MOTILENT LIMITED, London (GB)

( * ) Notice: Subject to any disclaimer, the term of this patent is extended or adjusted under 35 U.S.C. 154(b) by 495 days.

(21) Appl. No.: 18/135,019

(22) Filed: Apr. 14, 2023

(65) Prior Publication Data

US 2023/0334661 A1 Oct. 19, 2023

Related U.S. Application Data

(60) Provisional application No. 63/447,910, filed on Feb. 24, 2023, provisional application No. 63/331,448, filed on Apr. 15, 2022.

(51) Int. Cl.
*G06T 7/00* (2017.01)

(52) U.S. Cl.
CPC .. *G06T 7/0012* (2013.01); *G06T 2207/10088* (2013.01); *G06T 2210/41* (2013.01)

(58) Field of Classification Search
CPC ......... G06T 7/0012; G06T 2207/10088; G06T 2210/41
See application file for complete search history.

(56) References Cited

U.S. PATENT DOCUMENTS 9,513,357 B2 * 12/2016 Hsiao ........................ A61B 5/02
11,769,292 B2 * 9/2023 Bharadwaj .......... G06F 3/04847 600/426
12,008,759 B2 * 6/2024 Hermosillo Valadez .................... G06T 7/0016
2012/0299916 A1 * 11/2012 Giphart ................... G06T 15/00 382/131
2015/0049083 A1 * 2/2015 Bidne ................... G06T 19/006 345/420
2020/0005461 A1 * 1/2020 Yip ......................... G06T 7/174

(Continued)

FOREIGN PATENT DOCUMENTS

CN 114176774 A * 3/2022 ............. A61B 34/10

OTHER PUBLICATIONS

Yang, J., Han, S., & Xu, J. (2021). Deep Learning-Based Magnetic Resonance Imaging Features in Diagnosis of Perianal Abscess and Fistula Formation. Contrast media & molecular imaging, 2021, 9066128. https://doi.org/10.1155/2021/9066128 (Year: 2021).*

(Continued)

*Primary Examiner* — Utpal D Shah
*Assistant Examiner* — Jack Peter Kraynak
(74) *Attorney, Agent, or Firm* — Dorsey & Whitney LLP

(57) ABSTRACT

Systems and methods for generating annotations associated with medical imaging data are disclosed. A method described herein includes receiving volumetric medical imaging data including a structure, displaying a first node of a branching annotation on top of the medical imaging data responsive to input from a user, and extending the branching annotation through the structure by displaying a continuous path between the first node and at least a second node of the branching annotation.

9 Claims, 13 Drawing Sheets

(56) References Cited

U.S. PATENT DOCUMENTS

| | | | | |
|---|---|---|---|---|
| 2022/0148181 | A1* | 5/2022 | Murray | G16H 30/40 |
| 2024/0289971 | A1* | 8/2024 | Shino | G06T 7/344 |

OTHER PUBLICATIONS

De Jonge, C. S., Menys, A., van Rijn, K. L., Bredenoord, A. J., Nederveen, A. J., & Stoker, J. (2019). Detecting the effects of a standardized meal challenge on small bowel motility with MRI in prepared and unprepared bowel. Neurogastroenterology & Motility, 31(2), e13506. (Year: 2019).*

Lung PFC, Sahnan K, Burling D, et al. Volume assessment magnetic resonance imaging technique for monitoring perianal Crohn's fistulas. Therapeutic Advances in Gastroenterology. 2018;11. doi:10.1177/1756284818793609 (Year: 2018).*

Menys, AH; (2015) Evaluation of intestinal motility with Magnetic Resonance Enterography and computer post-processing. Doctoral thesis , UCL (University College London) (Year: 2015).*

Guz, W., Ożóg, Ł., Aebisher, D., & Filip, R. (2021). The use of magnetic resonance imaging technique and 3D printing in order to develop a three-dimensional fistula model for patients with Crohn's disease: personalised medicine. Gastroenterology Review/Przegląd Gastroenterologiczny, 16(1), 83-88. (Year: 2021).*

Swenson, C. W., Masteling, M., Delancey, J. O., Nandikanti, L., Schmidt, P., & Chen, L. (2020). Aging effects on pelvic floor support: a pilot study comparing young versus older nulliparous women. International urogynecology journal, 31(3), 535-543. (Year: 2020).*

K. F. Noakes, I. P. Bissett, A. J. Pullan and L. K. Cheng, "Anatomically Based Computational Models of the Male and Female Pelvic Floor and Anal Canal," 2006 International Conference of the IEEE Engineering in Medicine and Biology Society, New York, NY, USA, 2006, pp. 3815-3818, (Year: 2006).*

* cited by examiner

VIEWING PANE 1

VIEWING PANE 2

VIEWING PANE 3

500

SYSTEM TO CHARACTERIZE TOPOLOGY AND MORPHOLOGY OF FISTULAE FROM MEDICAL IMAGING DATA

CROSS REFERENCE TO RELATED APPLICATIONS

This application claims the benefit of priority pursuant to 35 U.S.C. § 119(e) of the Applicant's U.S. Provisional Patent Application No. 63/331,448, filed Apr. 15, 2022, titled "System to Characterize Topology and Morphology of Fistulae from Medical Imaging Data," and the Applicant's U.S. Provisional Patent Application No. 63/447,910, filed Feb. 24, 2023, titled "Virtual Examination System," which are hereby incorporated by reference in their entireties for all purposes.

FIELD

The described embodiments relate generally to systems and methods to analyze, segment and annotate volumetric medical imaging data, such as magnetic resonance imaging (MRI) and ultrasound scans, and to generate models using such medical imaging data.

BACKGROUND

Fistulae are abnormal connections between surfaces of epithelial tissue within the human body. They may be caused by infection, inflammation, injury, or surgery. A fistula may occur in any part of the body where epithelial tissue is present. A common type of fistula is an anal fistula ("fistula" or "fistulae"), which has an incidence of approximately 10 per 100,000. Fistulae are particularly common in Crohn's sufferers, where the incidence is approximately 1 in 4. Effective fistula care often requires the cooperation of at least three different specialties: abdominal radiology, colorectal surgery, and gastroenterology/proctology. Cooperation between specialties may be difficult due to lack of common references across specialties and difficulties communicating information about patient treatment and/or condition across specialties.

SUMMARY

An example method described herein includes receiving volumetric medical imaging data including a structure, placing a first node of a branching annotation on top of the volumetric medical imaging data responsive to input from a user, and extending the branching annotation through the structure by displaying a continuous path between the first node and at least a second node of the branching annotation. The structure can be a fistula, and the volumetric medical imaging data can be MRI data and/or ultrasound data. In some implementations, the continuous path is a Bezier-style curvature without discontinuities, In some implementations, displaying the continuous path includes generating the continuous path. In some implementations, the method can include fusing the volumetric medical imaging data with second imaging data of the structure, such as fusing MRI data the second imaging data being obtained by an imaging modality other than MRI. In some implementations, the method can include displaying an uncertainty of the branching annotation. In some implementations, the method can include displaying annotations along the branching annotation corresponding to areas of interest of the structure. In some implementations, the method can include generating summary metrics for the structure based on the continuous path comprising one or more of area, volume, texture, tortuosity, or total length of the structure.

An example method described herein includes displaying, via a user interface, volumetric medical imaging data, receiving, via the user interface, a first user input selecting a planar region in the volumetric imaging data, and rendering a three-dimensional rendering of the volumetric data by rendering, in three dimensions, a subset of elements of the volumetric imaging data, the subset of elements being within the selected planar region. In some implementations, the volumetric imaging data includes voxels, and the subset of elements in volumetric space is a subset of the voxels of the volumetric imaging data. In some implementations, the volumetric medical imaging data is magnetic resonance imaging (MRI) data. In some implementations, the volumetric imaging data includes imaging of anorectal musculature.

An example method described herein includes analyzing a first three dimensional model of a structure to create a first set of numerical scores related to the structure, performing a treatment on the structure utilizing the three dimensional model and the first set of numerical scores, analyzing a second three dimensional model of the structure to create a second set of numerical scores related to the structure after treatment, and evaluating a response of the structure to the treatment based on a comparison between the first set of numerical scores and the second set of numerical scores.

An example embodiment includes a method of generating a virtual model. The method includes receiving, at a virtual examination system, a plurality of images of a patient collected using magnetic resonance (MR) imaging, receiving, at the virtual examination system, a first input identifying a first structure shown in the plurality of images of the patient, receiving, at the virtual examination system, a second input identifying a second structure shown in the plurality of images of the patient, and generating, using the first input and the second input, a virtual model of the first structure and the second structure for use in treating a disease state of the patient. wherein the disease state is a perianal fistula, and wherein the first structure is an anal canal of the patient and the second structure is a levator plate of the patient. In some implementations, the method includes receiving a third input identifying a third structure shown in the plurality of images of the patient, the third structure comprising a skin surface of the patient, and receiving a fourth input identifying a fourth structure shown in the plurality of images of the patient, the fourth structure comprising a fistula tract. In some implementations, the first input includes a centerline drawn through at least a portion of the anal canal of the patient on at least one of the plurality of the images. In some implementations, the second input includes a polyline drawn from the top of an external sphincter along the levator plate of the patient on at least one of the plurality of the images. In some implementations, the third input includes a line drawn on at least one of the plurality of the images to identify the skin surface of the patient. In some implementations, the first input and the second input are received from a first user device, and the method further includes accessing the virtual model at a second user device, and generating a visualization using the virtual model of one or more forks in the perianal fistula to provide context for a user to perform a procedure to treat the perianal fistula. In some implementations, the method includes evaluating a treatment of the disease state of the patient by determining at least one initial measurement using the virtual model, the virtual model being generated before the treatment, and comparing the at least one initial measurement to at least one additional measurement determined using a second virtual model generated subsequent to the treatment. In some implementations, the method includes causing display of the virtual model in a user interface that allows a user to manipulate the virtual model to view the first structure and the second structure from a plurality of angles. In some implementations, the method includes receiving a markup of the virtual model at a first user device, the markup including an indication of at least one feature of interest, and causing display of the markup of the virtual model at a second user device.

An example embodiment includes a system for generating a virtual model and a branching annotation. The system includes one or more processors, one or more displays, and one or more non-transitory memories. The non-transitory memories carry instructions that, when executed, cause the system to display medical imaging data including a structure on the one or more displays, receive a first input identifying the structure, generate a virtual model representing the structure using the first input, receive a second input indicating a location for a branching annotation on the structure, and generate the branching annotation, including a set of nodes and a continuous path joining the set of nodes.

Additional embodiments include apparatuses or systems comprising one or more processors and one or more memories carrying instructions to cause the one or more processors to perform one or more methods disclosed herein. Furthermore, embodiments may include one or more non-transitory computer-readable media carrying instructions that, when executed, cause a system to perform one or more methods disclosed herein.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

DETAILED DESCRIPTION

Figure 1A:
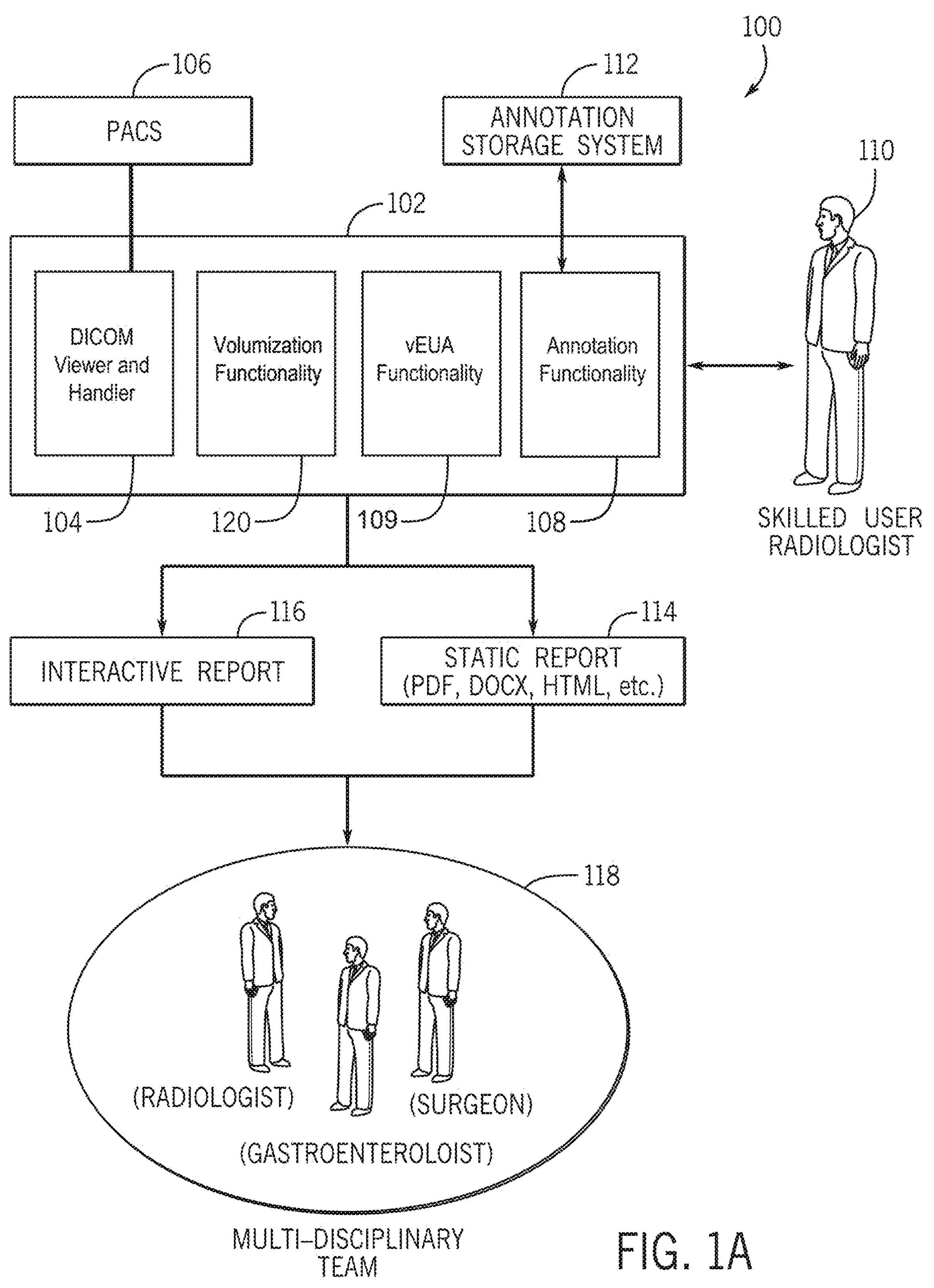
FIG. 1A is a schematic diagram illustrating an environment in which a fistula analysis system can be used, in some implementations.

Treatment of anal fistulae is often surgical, which may involve either disconnection of the internal opening from the fistula tract and removal of residual infected glands, or plugging with either animal or human-derived cells. Where surgery is not viable or desirable, the symptoms caused by fistulae, and further progression of the fistula itself, may be managed using anti-inflammatory drugs, immunotherapy, antibiotics, and drainage.

Management of fistulae requires complete and accurate examination, ideally by a combination of examination under anesthesia (EUA), MRI, and endoscopic ultrasound (EUS). For complex fistulae cases, which are common in fistulae caused by Crohn's disease, accurately mapping all extensions is vital, as missed extensions are the leading cause of relapse following surgery. Furthermore, accurate mapping of the perianal region and all fistulae and extensions is vital for planning successful surgery, as errors may result in severe complications, such as incontinence.

Currently, the only way to accurately map all extensions is via EUA or MRI. MRI is generally preferred to EUA, as it does not require anesthetic, is well tolerated, and does not require the involvement of a well-trained surgeon. Studies have even suggested that MRI is superior in sensitivity to EUA. For this reason MRI is considered the "gold standard" for preoperative assessment.

Despite the importance of MRI in the assessment, classification and surgical planning of fistula/ae, a system which allows a skilled radiologist or gastroenterologist to digitally mark-up and characterize fistulae from MRI data does not exist. Current systems may classify fistulae based on MRI (e.g., the St. James University Hospital classification); based on surgical examination (e.g., the Parks surgical classification); or based on symptoms (several different systems such as the Anal Disease Activity Index, the Perianal Disease Activity Index, the Fistula Drainage Assessment, and Pikarsky's Perianal Crohn's Disease Activity Index). The above systems attempt to classify a wide-ranging and highly complex disease either using numerical scoring, description via standardized terms, or some combination thereof. However, each system has several drawbacks. Each system is generally tied to a particular sub-specialty, (i.e. surgery, gastroenterology, or radiology), hampering attempts to apply the necessary multidisciplinary approach to the disease. The systems vary in their ability to predict outcomes, although an emerging consensus is that radiological systems have the best performance of existing systems in this regard. Further, the systems lack auditability. As classification systems have a degree of subjectivity, it would be desirable to retain the record of the reasoning by which particular classification was arrived at, for retrospective case review and for research.

It is, therefore, an object of the present disclosure to provide a system that allows the characterization the topology and morphology of fistulae from medical imaging data in a fully auditable way using interactive software. It is further an object of the present disclosure to provide a system to generate virtual models for fistula evaluation and treatment.

Disclosed herein are systems and related methods for analyzing fistulae using medical imaging data, including a fistula annotation functionality and a virtual examination under anesthesia (vEUA) functionality ("system" or "fistula analysis system"). The fistula annotation functionality of the system includes functionality for generating, through experienced user input, and storing a digital representation of the topology and morphology of fistula disease based on volumetric medical imaging data, such as MRI. The fistula annotation functionality of the system can generate one or more annotations, such as to allow a skilled radiologist or gastroenterologist to digitally mark up and characterize fistulae from MRI data. The annotations can be used to classify or describe topology and morphology of one or more fistulae and/or surrounding tissues. For example, the system can be used to add annotations to a displayed model (e.g., 2D or 3D model) of a system of one or more fistulae via a graphical user interface. The annotations can be branching annotations, which can include a set of nodes joined by one or more lines or curves, such as Bezier-like curves. The annotations can be used to indicate or determine various characteristics associated with a patient's anatomy, such as characteristics of one or more fistulae.

Problems addressed by the disclosed technology include problems related to the topology and morphology of fistulae, which can vary widely and be difficult to characterize using existing technologies.

The vEUA functionality of the system includes functionality for generating a digital model of a patient's anatomy using MRI data, such as a digital model of perianal anatomy, which can be used to characterize and/or evaluate one or more fistulae. This model may be referred to as a virtual examination under anesthesia (vEUA). The model can be a digital equivalent, analog, or supplement to the examination usually performed by the surgeon while the patient is under anesthesia. Necessity of a physical EUA, which is expensive and carries some risk to the patient, can be obviated by a sufficiently detailed report from the radiologist, and a sufficiently high level of understanding of that report by the surgeon. A goal of the vEUA functionality is to enable a radiologist to capture this level of detail, and for the surgeon to reach this level of understanding, in as time-efficient manner as possible. Advantages of the vEUA functionality of the system include providing improved technologies for communicating information related to disease management for a patient. For example, existing systems typically provide disjointed communications between a patient, a primary care physician, a colorectal surgeon, a radiologist and a gastroenterologist or proctologist. A radiologist may report to a gastroenterologist and a colorectal surgeon, while the colorectal surgeon may report to the gastroenterologist and radiologist (e.g., for follow-up), but different specialists may use different terminology and/or different communication or documentation systems to plan for treatment, disease management, and the like. Additionally, specialists may not have access to the same patient information in the same format. By contrast, the vEUA functionality of the system provides technologies for a unified set of information, such as a model, for documenting a patient condition, planning for treatment, managing symptoms, evaluating results of treatment, and so forth.

Visualizations created using the vEUA functionality of the system described herein may further assist surgeons or other providers with surgical management of perianal fistulae. In various examples, a surgeon treating a perianal fistula may place a seton to encourage healing and/or remove puss or other tissue from the fistula to encourage healing. Such procedures are often difficult for complex fistulae or fistulae with certain types of behavior, and surgeons may decline to treat such complex fistulae surgically to eliminate or reduce risks of making a patient incontinent. Visualization, such as a visualization generated using the vEUA functionality of the system disclosed herein, of such complex fistulae before entering surgery may provide additional context to a surgeon, allowing the surgeon to manage complex fistulae with reduced risk to the patient.

Similarly, visualizations generated using the vEUA functionality of the system disclosed herein may assist surgeons in planning for procedures. For example, where a fistula includes forks in the tracts, planning may help a surgeon from missing placing a seton in one of the portions or branches extending from the fork, which could result in additional surgery. Similarly, such visualizations may help surgeons plan for use of other technology or treatments, such as drug-eluting plugs. For example, if a surgeon expects to use 10 cm of plug and end up with additional length of a 10 cm plug, the surgeon may be alerted that the plug has not been placed correctly. Further, the visualizations may assist surgeons in placing drugs or other treatments, such as stem cell injections, into the correct part of the fistula. The surgeon may further mark, in such a visualization, where injections were placed, providing additional information to other providers. Accordingly, visualizations described herein may assist surgeons in planning for and performing various procedures to treat anal fistulae.

The visualizations generated using the vEUA functionality of the system disclosed herein may further assist other providers, such as gastroenterologists. For example, the visualizations may be utilized to extract objective measures of treatment, helping gastroenterologists to measure effectiveness of various treatments. The visualizations may be used to extract objective measurements, such as volume of collection, volume of fistula, length of tracts, texture of a wall, signal of the fistula wall, and the like. Such measurements may be used individually and/or may be used in combination to provide a treatment response score, helping the gastroenterologist to more effectively manage treatment. In contrast, existing fistula scoring systems, such as the van Assche score, do not capture information about treatment response. Measurement of treatment response saves time by reducing time spent treating patients with ineffective treatments, as well as money which would otherwise be spent on ineffective treatments.

Use of the vEUA functionality of the system has several advantages. The patient may be kept informed of their disease state and treatment plan. The surgeon has an opportunity to plan surgery using objective quantifiable heuristics (such as position of abscess) by rotating the 3D model to the surgical perspective. The patient does not need to go under general anesthesia until the surgeon has decided and planned the course of treatment, which may avoid surgery altogether if deemed inappropriate. The patient's disease state can be kept up-to-date with a single source of truth. For example, surgical interventions can be marked onto the model, and remission or relapse may be assessed by follow-up vEUAs. The model can further be accessed asynchronously by different specialists, where all specialists are equally empowered to interpret the model without being encumbered by the jargon or observations of another specialist. Objective longitudinal assessment of the patient over time can be carried out, allowing precision medicine and straightforward participation in clinical trials.

Performing or generating a vEUA can include at least three operations. First, medical imaging data can be acquired or received, such as MR images associated with a patient. Second, the medical imaging data can then be used to build a model of anatomy included in the medical image data. Third, the model can be analyzed, such as to identify fistulae, abscesses, or the like. In some implementations, the model can be annotated using the fistula annotation functionality of the system. Various protocols for perianal fistula MRI can be used with the vEUA functionality of the system, and one such protocol is illustrated in Table 1 below.

TABLE 1

| Plane | Sequence | Additional Information |
| --- | --- | --- |
| Coronal | TIRM 4 mm | Include posterior skin surface to levator ani. Angled parallel to anal canal. |
| Sagittal/ Oblique | TIRM 3 mm | Use previous sequences to angle along fistula. |
| Axial | TIRM 4 mm | Through any fistula to include levator ani. Angled perpendicular to anal canal. |
| | T2 tse 3 mm | Small FOV covering sphincter to anal verge. Angled perpendicular to anal canal. |
| Peri-anal fistula for Crohn's Disease need following sequences added to routine fistula protocol: | | |
| Axial | T1 tse fs | Pre Gad Small FOV covering sphincter to anal verge.<br>Angled perpendicular to anal canal.<br>Administer Gadolinium Contrast Agent (as per recommended dosage)<br>Post Gad |

To build a model using the vEUA functionality of the system, the system receives a plurality of images of a patient collected using MR imaging. The MR images can include images of an anatomy where one or more fistulae are present in the patient. The system receives a first input identifying a first structure shown in the plurality of images. The first structure can be, for example, an anal canal, and the first input can specify one or more dimensions and/or position or orientation information about the first structure. The system receives a second input identifying a second structure shown in the plurality of images. The second structure can be, for example, a levator plate, and the second input can specify one or more dimensions and/or position or orientation information about the second structure. Using the first input and the second input, the system generates a virtual model representing at least the first structure and the second structure. The generated model can be used for treating a disease state of the patient, such as one or more fistulae.

Turning to the figures, FIG. 1A is a schematic diagram illustrating an environment 100 in which a fistula analysis system 102 can be used, in some implementations. In the illustrated embodiment, the fistula analysis system 102 comprises or uses an annotation-drawing interface built on top of a Digital Imaging and Communications in Medicine (DICOM) handler and viewer 104 capable of loading and viewing volumetric medical imaging data, such as MRI scans. In some implementations, the system 102 comprises only an annotation functionality 108 and/or a vEUA functionality 109, and other illustrated components can be external to the system 102. In some embodiments, the DICOM viewer 104 may load the volumetric medical imaging data from a picture archiving and communication system (PACS) node 106 using either the DICOM protocol or other file format. In some embodiments, an annotation functionality 108 included in the system 102 may display a user interface to a skilled user 110, such as a radiologist, who may interact with the system 102 to produce an annotation. In some embodiments, annotations generated using the system 102 may be stored using an annotation storage system 112. In some embodiments, the system 102 may further be configured to produce one or both of a static report 114 and/or an interactive report 116, which may provide information to the wider clinical team ("multi-disciplinary team") 118 or the patient themselves (not shown). In some embodiments, the system 102 may include or use a volumization functionality 120, which may interface with the annotation functionality 108 to extract calibration data from the DICOM metadata fields in order to ensure that the annotations correspond to real-world 3D coordinate systems.

In some implementations, the system 102 can include a vEUA functionality 109, as described herein, for generating one or more models. For example, the vEUA functionality 109 can be used to generate a model and the annotation functionality 108 can be used to generate one or more annotations included in or associated with the model.

Figure 1B:
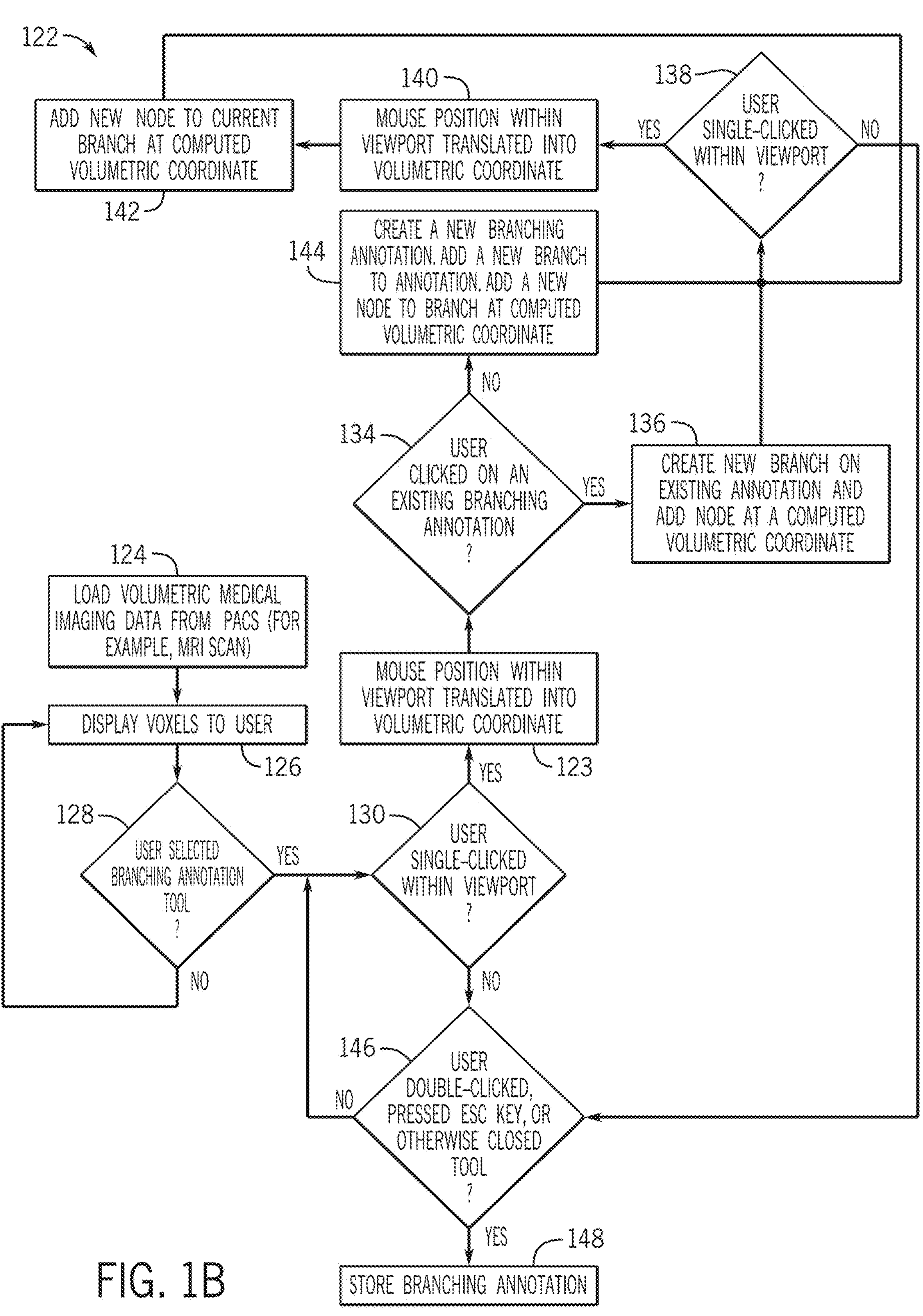
FIG. 1B is a flow chart illustrating a method of creating an annotation using the fistula annotation functionality of the system, in some implementations.

FIG. 1B is a flow chart illustrating a method 122 of creating an annotation using the fistula annotation functionality 108 of the system 102, in some implementations. The method can be performed using a tool provide by the system 102, such as a software application having one or more interfaces for generating annotations for medical images. Generally speaking, the method 122 adds one or more annotations associated with volumetric medical imaging data, such as a calibrated volume surface representing one or more fistulae and/or surrounding tissues. In some implementations, the annotation can be generated for or related to a model generated using the vEUA functionality 109 of the system 102. In the illustrated embodiment, the user can use the system 102 to generate a branching annotation comprising one or more branches on top of volumetric medical imaging data by means of a simple point-and-click interface. For example, when the user left-clicks, a location of the click is determined using a volumization functionality 120 of the system 102, and a new node at the location is added to an annotation data structure in the current branch. If there is no existing active annotation at the location, then a new annotation is created with a new branch, and/or a new node is created at the location determined via the volumization system using the position of the cursor within the calibrated volume surface. If the user clicks on a part of an existing annotation, then a new branch is added to that annotation as a child of the branch corresponding to the position of the cursor, and a node is added to that branch at the location determined via the volumization functionality 120 using the position of the cursor within the calibrated volume surface. In some embodiments, the branches may have a hierarchical relationship to one another as shown in FIG. 10. In some embodiments each annotation may be associated with a particular unique frame of reference as identified by a DICOM unique identifier (UID).

The method 122 begins at block 124, where volumetric medical imaging data is provided to the system 102. The volumetric medical imaging data can be, for example, MRI data loaded from a PACS system. The volumetric medical imaging data can include one or more structures (e.g., fistulae). The volumetric medical imaging data can comprise images and/or other data of one or more fistulae of a patient, such as MRI images of an anatomy of the patient where the one or more fistulae are present.

The method 122 proceeds to block 126, where voxels are displayed to a user of the system 102 via a display. The voxels can comprise at least a portion of the volumetric medical imaging data received at block 124. For example, displayed voxels can comprise at least a portion of MRI images depicting the anatomy of the patient where the one or more fistulae are present, and the voxels can be displayed via a user interface provided by the system 102.

The method 122 proceeds to block 128, where the system 102 determines whether the user has selected a branching annotation tool. The branching annotation tool can be selected, for example, via the user interface, such as by submitting a command, selecting an icon, selecting a menu option, and so forth.

If, at block 128, the system 102 determines that the branching annotation tool has not been selected, then the method 122 returns to block 126 to continue displaying the voxels to the user.

If, at block 128, the system 102 determines that the branching annotation tool has been selected, then the method 122 proceeds to block 130, where the system 102 determines whether a user has clicked (e.g., performed a single right click or a single left click) within a viewport, such as a window or portion of the user interface where the voxels are being displayed.

If, at block 130, the system 102 determines that the user has clicked within the viewport, then the method 122 proceeds to block 132, where a position of the click within the viewport is translated to a volumetric coordinate. In other words, a location where the user clicks is translated to a volumetric coordinate to indicate a location associated with the annotation, such as a node to be included in the annotation.

The method 122 proceeds to block 134, where the system 102 determines whether the click received at block 130 is at a same location of an existing branching annotation.

If, at block 134, the system 102 determines that the click is at the same location of the existing branching annotation, then the method proceeds to block 136, where a new branch is created on the existing branching annotation and a node is added to the existing branching annotation at the volumetric coordinate determined at block 132.

The method 122 may proceed to block 138, where the system 102 again determines whether a user has clicked (e.g., performed a single right click or a single left click) within the viewport. If, at block 128, the system 102 determines that the user has clicked within the viewport, then the method proceeds to block 140, where a position of the click within the viewport is translated to a volumetric coordinate.

The method 122 proceeds to block 142, where a new node is added to the current branch at the volumetric coordinate determined at block 140.

Returning to block 134, if the system 102 determines that the user did not click on an existing branching annotation, then the method 122 proceeds to block 144, where the system 102 creates a new branching annotation, adds a new branch to an annotation, and/or adds a new node at a branch at the volumetric coordinate determined at block 132.

The method 122 may proceed to block 146 upon the occurrence of at least one of: (1) determining at block 130 that the user has not clicked within the viewport, (2) performance of one or more operations at block 136, (3) performance of one or more operations at block 144, (4) performance of one or more operations at block 142, or (5) determining at block 138 that the user has not clicked within the viewport. At block 146, the system 102 determines whether the user clicked (e.g., performed a double right click or a double left click), pressed the escape key, or otherwise closed or exited the tool.

If, at block 146, the system 102 determines that the user has not exited the tool, then the method 122 proceeds to block 130 to monitor for additional clicks.

If, at block 146, the system 102 determines that the user has exited the tool, then the method 122 proceeds to block 148, where the system 102 stores the branching annotation. Storing the branching annotation can include generating and/or storing a data structure, such as the data structure 150 of FIG. 10.

Although particular operations are illustrated in method 122, operations can be added to and/or removed from the illustrated method without deviating from the teachings of the present disclosure. Additionally, the depicted operations can be performed in a different order, including performing one or more operations in parallel. Moreover, any number of annotations comprising any number of nodes and/or branches can be generated using the illustrated method.

Additionally, although particular operations for controlling the annotation tool are described, such as clicking to initiate certain operations, other operations for controlling the annotation tool can be used. For example, the annotation tool can likewise be controlled using a touchscreen, gesture-based controls, menus, icons or other graphic elements, and so forth.

In some implementations, the method 122 can additionally or alternatively include receiving and/or generating metadata for inclusion in an annotation and/or generating a curve to join two or more nodes included in an annotation (e.g., as illustrated with reference to FIGS. 2A and 2B). For example, metadata can be received and/or generated regarding numerical scores grading a structure (e.g., fistula or anatomical structure), measurements of length, texture, and tortuosity, and the like.

In some implementations, the method 122 includes displaying one or more nodes on top of the volumetric medical imaging data and/or determining one or more paths via the one or more nodes. For example, the method can include displaying at least a first node on top of the volumetric imaging data and extending the branching annotation through the structure (e.g., fistula) by displaying a continuous path between the first node and at least a second node. The continuous path can be a generated Bezier or Bezier-style curve, which can have discontinuities.

In some implementations, the method 122 can include fusing the volumetric medical imaging data with second imaging data that includes the structure, such as second imaging data from a different modality. For example, the volumetric medical imaging data can include MRI data and the second imaging data can include ultrasound data, or vice versa. In these and other implementations, in-theatre transrectal ultrasound data can be fused (e.g., in real time) to preoperative MRI data.

In some implementations, the method 122 can include determining and/or displaying an uncertainty associate with the generated annotation, such as a user-indicated uncertainty associated with a location, shape, or other characteristic of one or more fistulae.

In some implementations, the method 122 includes displaying annotations along a branching annotation, the annotations corresponding to areas of interest (e.g., of a fistula or other structure).

In some implementations, the method 122 includes generating summary metrics for a structure (e.g., fistula) based on a generated continuous path, such as at least one of an area, a volume, a texture, a tortuosity, or a length. For example, these and other summary metrics can be generated and displayed using one or more user interfaces, such as the user interface 700 of FIG. 7, e.g., in the form of a graph, graphic, numerical display, of the like.

In some implementations, the method 122 includes generating a model using the vEUA functionality of the system 102. For example, the vEUA functionality can generate a model using the volumetric medical imaging data, and the voxels displayed to the user can include the generated model.

FIG. 10 is a schematic diagram illustrating a data structure 150 used to store an annotation 152 generated using the system 102, in some implementations. The data structure 150 is used to store one or more annotations 152, such as branching annotations, which may describe aspects or features of one or more fistulae represented by a model. The data structure 150 includes one or more nodes 154*a-c* and branches 156*a-c* included in or associated with the annotation 152. A node 154 can be a parent node and/or a root node, and each root node is associated with a respective branch 156. Branches 156 can be parent branches and/or non-root branches. The branches 156*a-c* can be arranged hierarchically. The data structure 150 can have a tree structure, which is maintained such that the first node 154 for each non-root branch 156 is the last node 154 of the parent branch 156. In some embodiments, each node 154 may additionally be associated with metadata. This metadata may include, but is not be limited to, information regarding degrees of (un) certainty, anatomical data, clinical data, and notes regarding treatment. Metadata may be inputted during the creation of the annotation 152, such as, for example, allowing the user to indicate certainty or uncertainty by left- or right-clicking during creation of each node 154; or post-hoc, for example, by selecting nodes 154 of an existing annotation 152 and using keyboard input to tag that node 154 with metadata. Some embodiments of the disclosed technology may include metadata of particular relevance to anorectal physiology. For example, metadata may include information on whether a segment of the annotated fistula is internal, external, or an abscess. In some embodiments, this may be inputted by the user at the time of drawing the annotation 152, or subsequently, by pressing hotkeys, such as keys "I," "E," or "A" (corresponding to internal, external, and abscess respectively), when the relevant segment of the annotation 152 is selected. Metadata may further be used by one specialist to communicate relevant information regarding treatment to another specialist. For example, in some embodiments, nodes 154 or segments of the data structure 150 may be indicated via the metadata as to being a possible injection site, allowing the radiologist to clearly indicate to the surgeon, who may review the report at a later date, the optimal injection site of therapeutic agents in the anatomy of the patient. Conversely, a surgeon may indicate where they injected a therapeutic agent on the model.

Figure 1C:
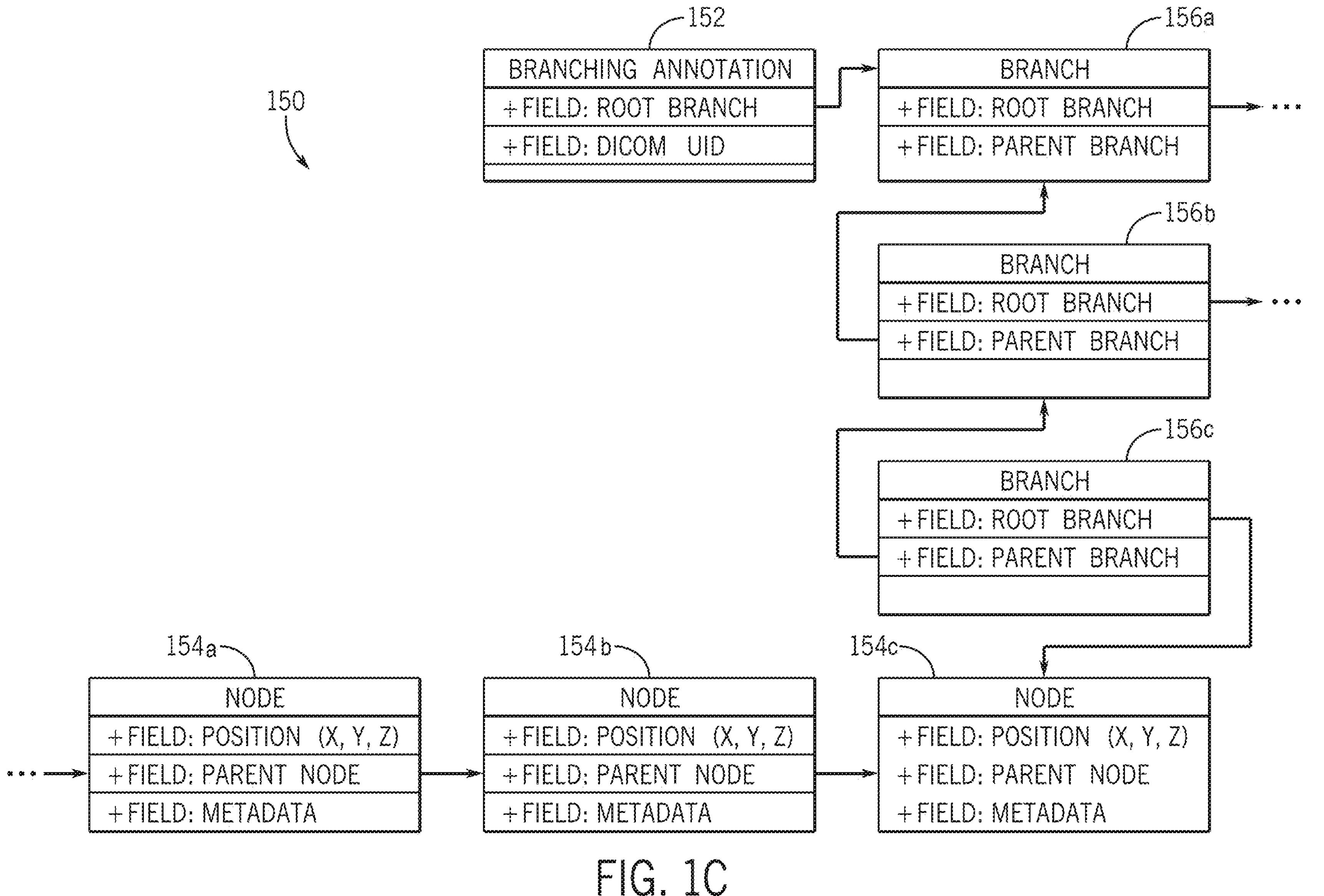
FIG. 1C is a schematic diagram illustrating a data structure used to store an annotation, in some implementations.
Figure 2A:
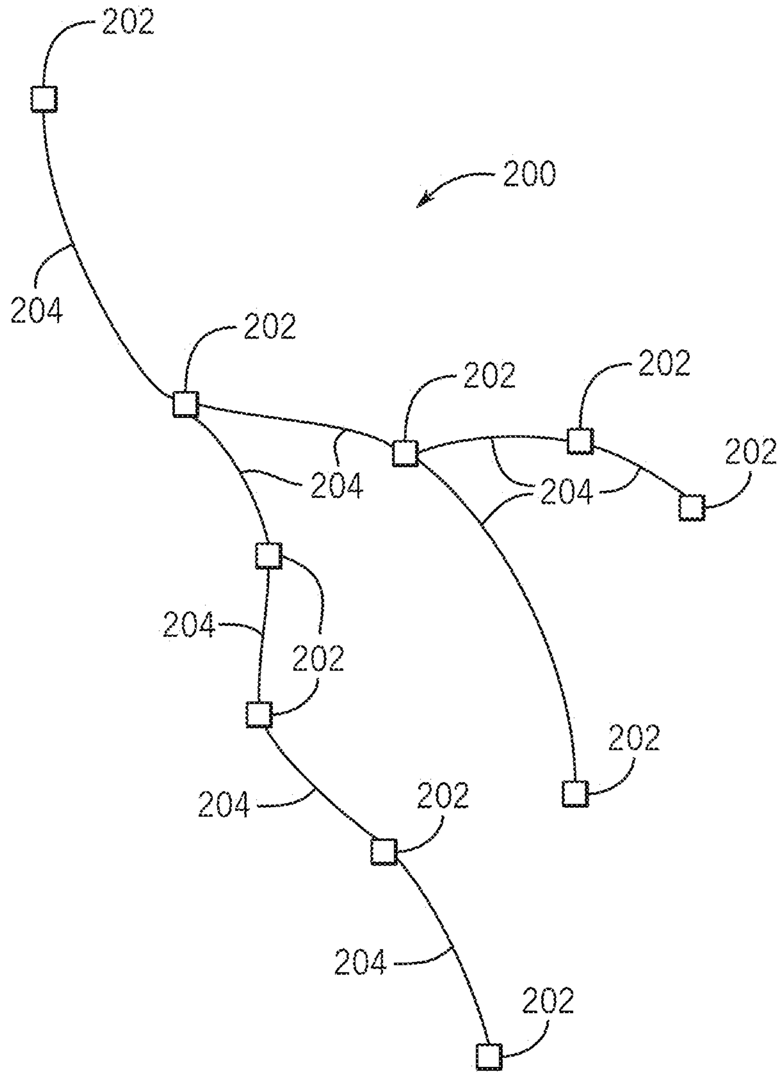
FIG. 2A is a display diagram illustrating a rendered annotation, in some implementations.

FIG. 2A is a display diagram illustrating a rendered annotation 200, in some implementations, such as an annotation that is displayed to the user during annotation creation or in generated reports. The annotation 200 can be an annotation generated using the method illustrated in FIG. 1B and/or an annotation having a data structure such as the data structure 150 of FIG. 1C. The annotation 200 can be generated using the system 102. The annotation 200 comprises a set of nodes 202 joined together via a set of curves or lines 204. Although the annotation 200 may be defined as a collection of nodes 202 in a data structure as shown in FIG. 1C, from the user perspective it represents a continuous branching path through a section anatomy, such as a system of fistulae. Therefore, during both the interactive creation of the annotation 200, and review of the annotation 200 in either an interactive or static report (e.g., for an annotation generated as illustrated FIG. 1B), it is desirable for the space between nodes 202 to be interpolated by a smooth curve (e.g., one or more of curves or lines 204). A method common in prior art for interpolating smooth lines between points is to draw a parametric curve according to a mathematical function. A common choice of function is a n-th order Bernstein polynomial in the desired number of dimensions (e.g., 3), defined by the equation $$B(t) = \sum_{i=0}^{n} \binom{n}{i} (1-t)^{n-i} t^i \vec{P}_i \tag{1}$$

where B(t) is the interpolated curve, $\vec{P}_0, \vec{P}_1, \ldots, \vec{P}_n$ are nodes, and t is a continuously-varying parameter between 0 and 1 inclusive. The parametric curve defined by this function is generally referred as a Bézier curve. In a branching annotation, such as the ones shown in FIGS. 2A & 2B, the interpolated curve cannot be described by a single Bernstein polynomial. Therefore to render the full branching curve, it is necessary to compute multiple curves, one for each segment (e.g., lines or curves 204).

Figure 2B:
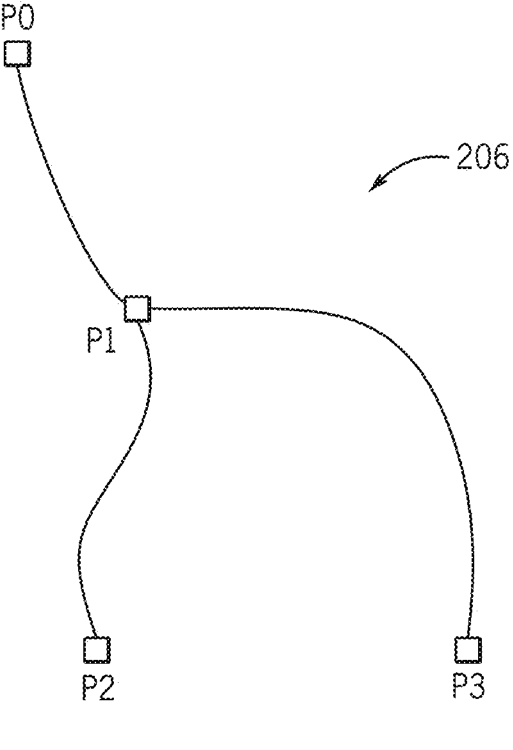
FIG. 2B is a display diagram of a simple rendered annotation, in some implementations.

FIG. 2B is a display diagram of a simple rendered annotation 206, in some implementations. The annotation 206 can be generated using the system 102. For the annotation 206 shown in FIG. 2B, rendering branching curves includes computing three curves: one which passes through points $\vec{P}_0, \vec{P}_1$, one which passes through points $\vec{P}_1, \vec{P}_2$, and one which passes through points $\vec{P}_1, \vec{P}_3$. If the curves were computed using the equation in (1), we would create three curves using the sets of points $\vec{P}_i=\{\vec{P}_0, \vec{P}_1\}$, $\vec{P}_i=\{\vec{P}_1, \vec{P}_2\}$ and $\vec{P}_i=\{\vec{P}_1, \vec{P}_3\}$ respectively. However, such a rendering would cause the branches to appear discontinuous and non-anatomical. To remedy this, the curve for each branch may be rendered not only using information contained within the branch itself (i.e., the points represented by the nodes within that branch), but using information from every node in the entire annotation. This ensures that the curve is influenced at all positions by every node within the annotation, which corresponds to the expected behavior of simple non-branching Bezier curves but allows it to be generalized for a branching structure.

A technique for generating an interpolated curve for a branching annotation which preserves a Bezier-style curvature without discontinuities whilst passing smoothly through all nodes may be described by the following pseudocode:

```
PointsAtLevel(Node, Level, PointList)
  CurrentLevel <- 0
  FOR EACH ChildeRef <- Node.Children
    CurrentNodeLevel <- CurrentLevel
    FOR EACH Point <- ChildeRef.Points
      IF CurrentNodeLevel = Level
        PointList.append(Point)
      ENDIF
      CurrentNodeLevel <- CurrentNodeLevel + 1
    ENDFOR
    IF CurrentNodeLevel < Level
      PointsAtLevel(ChildeRef, Level - CurrentNodeLevel, PointList)
    ENDIF
  ENDFOR
```

-continued

```
SubtreeCenterOfMass(Node, CurvePointList)
  Level <- 0
  PointList <- new List
  PointsAtLevel(Node, Level, PointList)
  WHILE PointList.Count > 0
    CenterOfMass <- SUM(PointsAtLevel) / PointList.Count
    CurvePointList.append(CenterOfMass)
    Level <- Level + 1
    PointList <- new List
    PointsAtLevel(Node, Level, PointList)
  ENDWHILE
FOR EACH Node <- Branch
  CurvePointList <- new List
  ParentRef <- Node.Parent
  WHILE ParentRef
    FOR EACH Point <- ParentRef.Points
      CurvePointList.insert(0, Point)
    ENDFOR
    ParentRef <- ParentRef.Parent
  ENDWHILE
  FOR EACH Point <- Node.Points
    CurvePointList.append(Point)
  ENDFOR
  FOR EACH Point <- SubtreeCenterOfMass(Node)
    CurvePointList.append(Point)
  ENDFOR
  BezierSpline <- *ComputeBezierSplineThrough(CurvePointList)
  TSliceStart = BezierSpline.ParameterAt(Node.Points[0])
  TSliceEnd = BezierSpline.ParameterAt(Node.Points[-1])
  BezierSpline <- BezierSpline.Slice(TSliceStart, TSliceEnd)
  *Draw(BezierSpline)
ENDFOR
```

Figure 3A:
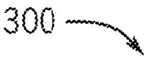
FIG. 3A illustrates an example simplified user interface, in some implementations.
Figure 3A:
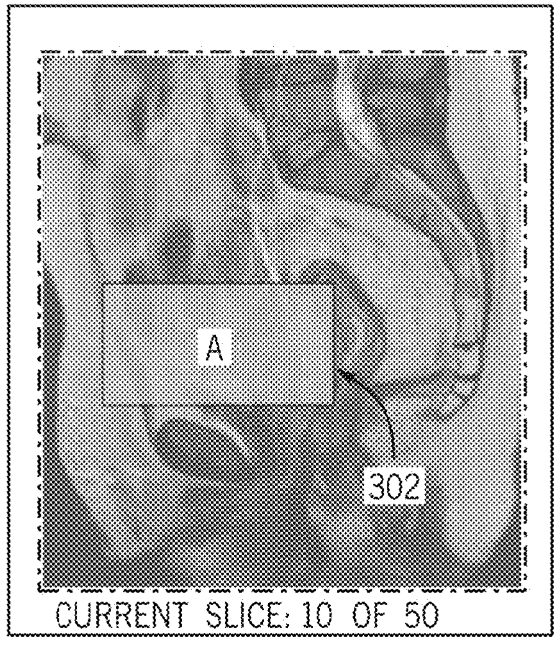
Figure 3A:
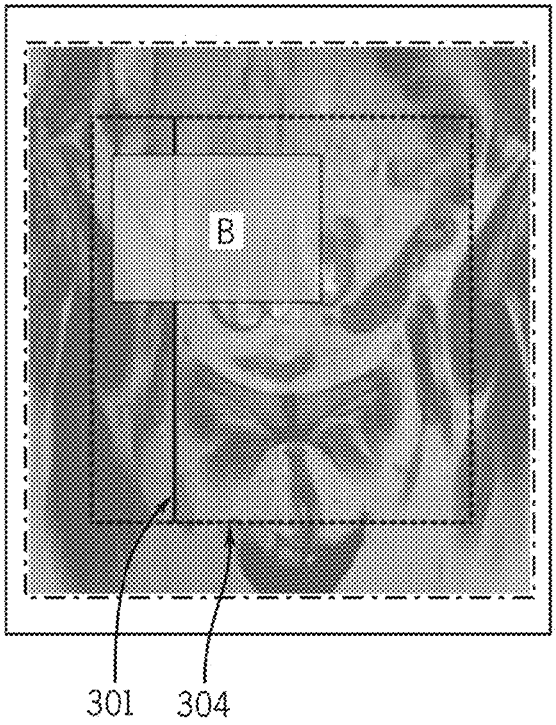
Figure 3A:
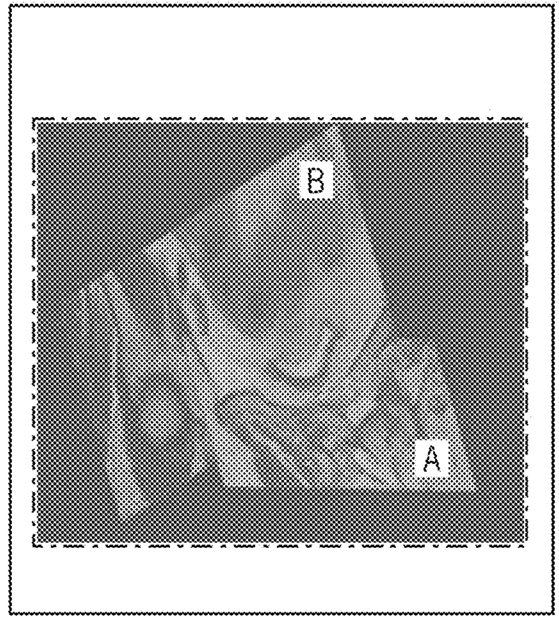

When tracking fistulae over time, and also planning treatment such as surgery, a method is needed for the radiologist, or other specialist, to not only record the structure and position of disease alongside clinical metadata, but to visualize these complex data embedded within volumetric medical imaging data such as MRI, ultrasound, or CT scans. Furthermore, in some situations it is desirable for the person reviewing the data to be able to customize the visualization according to their specific needs. For instance, the surgeon may wish to see where and how the fistula tract intersects with the anorectal musculature. In some instances, the radiologist or other specialist may segment the anorectal musculature using a 3D voxel brush technique already known or using an existing 'atlas' model or using a smart segmentation tool and also segment the fistula tract using the branching polyline technique described herein. In order to display to the user (which may be a surgeon planning a procedure) how the polyline representing the fistula tract intersects with the 3D volume representing the anorectal musculature embedded within the original volumetric medical imaging data, the following software system is disclosed:

FIG. 3A illustrates an example simplified user interface 300 that may be displayed to the user, in some implementations. In the illustrated embodiment, the user interface 300 comprises three viewing panes: Viewing Pane 1, Viewing Pane 2, and Viewing Pane 3. Although depicted as a single user interface 300, each viewing pane can alternatively be included in a separate user interface. Each viewing pane illustrates a different view of volumetric medical images of a patient. Viewing Panes 1 and 2 show slices in the sagittal and coronal planes of a volumetric medical imaging dataset. In some embodiments, the Viewing Panes may display slices from any two or more orthogonal or oblique planes within a volumetric imaging dataset. In some embodiments, text 301 may be displayed showing the user the index of the currently visible slice within the stack (e.g., "current slice 10 of 50"). In some embodiments, the location of the displayed slice displayed in Viewing Pane 1 may be shown in Viewing Pane 2 303. In some embodiments, a rectangle 304 with edges determined by the bounds of all the slices parallel to the slice being viewed in Viewing Pane 1 may be shown in Viewing Pane 2. The system 102 may allow the user to draw an arbitrary number of rectangular regions of interest (ROIs) in any Viewing Pane corresponding to the current frame of reference. In some embodiments ROIs of arbitrary shape and size may be drawn. Each ROI corresponds to a plane of voxels in real 3D space, which may be displayed in an interactive 3D viewport in Viewing Pane 3. For the sake of readability, FIG. 3A shows only two intersecting planes, however the system 102 may support an arbitrary number of planes in any orientation.

Figure 3B:
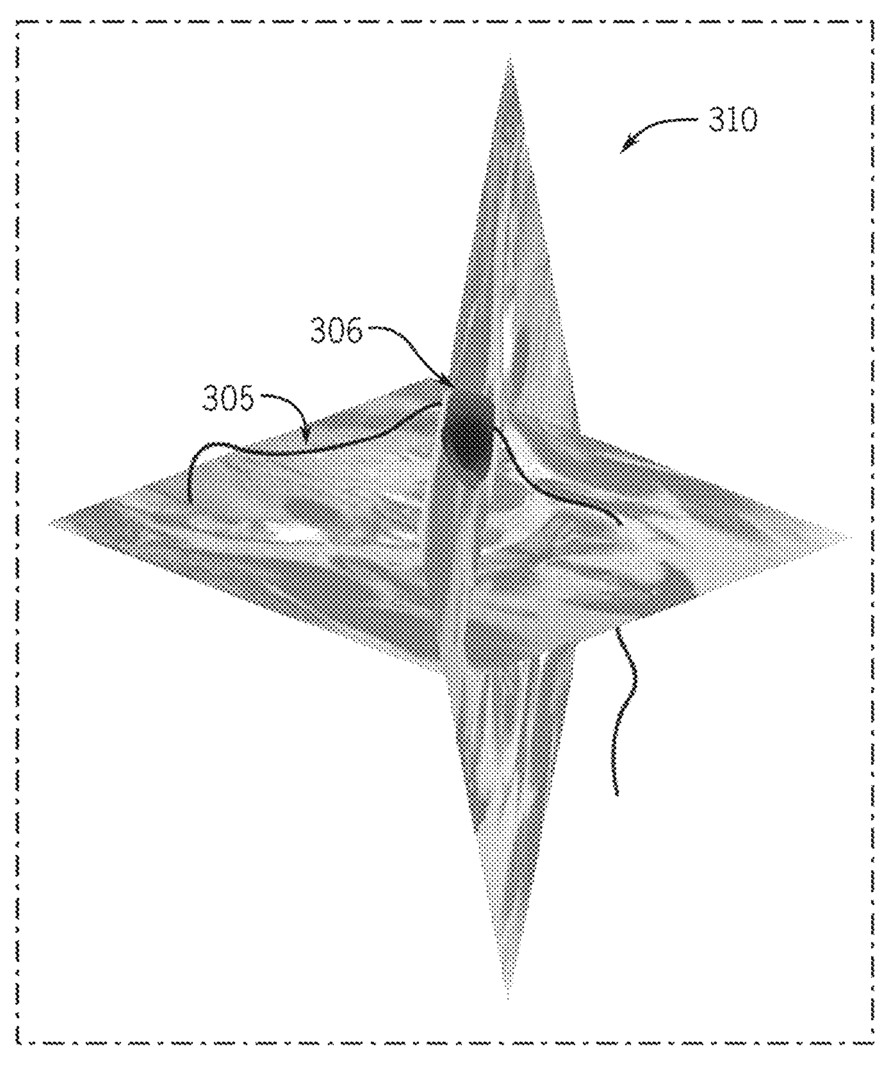
FIG. 3B is a display diagram illustrating a 3D visualization with the inclusion of 3D annotations, in some implementations.

FIG. 3B is a display diagram illustrating a 3D visualization 310 with the inclusion of 3D annotations, in some implementations. A polyline annotation 305 can be seen to intersect with a 3D voxel annotation 306 at a particular point in 3D space, alongside relevant anatomical contextual information extracted from volumetric medical imaging data such as MRI. As illustrated in the visualization 310, an advantage of the disclosed system arises in situations where it is necessary to communicate between specialists, or easily review at a later date, the precise shape and behavior of the segmented disease and how it relates to other segmented anatomy. For example, annotations generated using the system 102 (e.g., annotations 305 and/or 306) can easily be saved and provided to multiple members of a multidisciplinary team and/or other providers, so that details regarding a system of one or more fistulae can be easily communicated and used.

In various examples, the 3D visualization 310 with 3D annotations 305 and 306 may be used to plan and/or execute treatment involving visualized anatomical structures. For example, a fistula may be imaged and a 3D visualization 310 with 3D annotations 305 and 306 may be generated for the fistula. The 3D visualization may show features of the fistula, such as its intersections with other anatomical structures and its overall structure. Such features may be helpful when, for example, treating the fistula through surgical intervention, as the surgeon may be more informed regarding the anatomy of the fistula before the patient undergoes a procedure. Such visualizations may be further useful for other procedures, such as drug injections. Where drugs (e.g., biologics) are effective when injected into a certain structure, a visualization 310 of the structure may be used to improve drug delivery. For example, some drugs may be injected in the anorectal anatomy and, when not injected correctly, the drug may be drained from the body via the fistula tract such that the drug has no or little effect on the patient. 3D annotations 310 may also be helpful in tracking response to treatment of various structures. For example, 3D annotations 310 may include numerical scores grading a structure, measurements of length, texture, and tortuosity, and the like. Such annotations may be obtained both before and after treatment and may be compared to determine how well the patient is responding to treatment, as well as to plan any additional treatment.

Figure 3C:
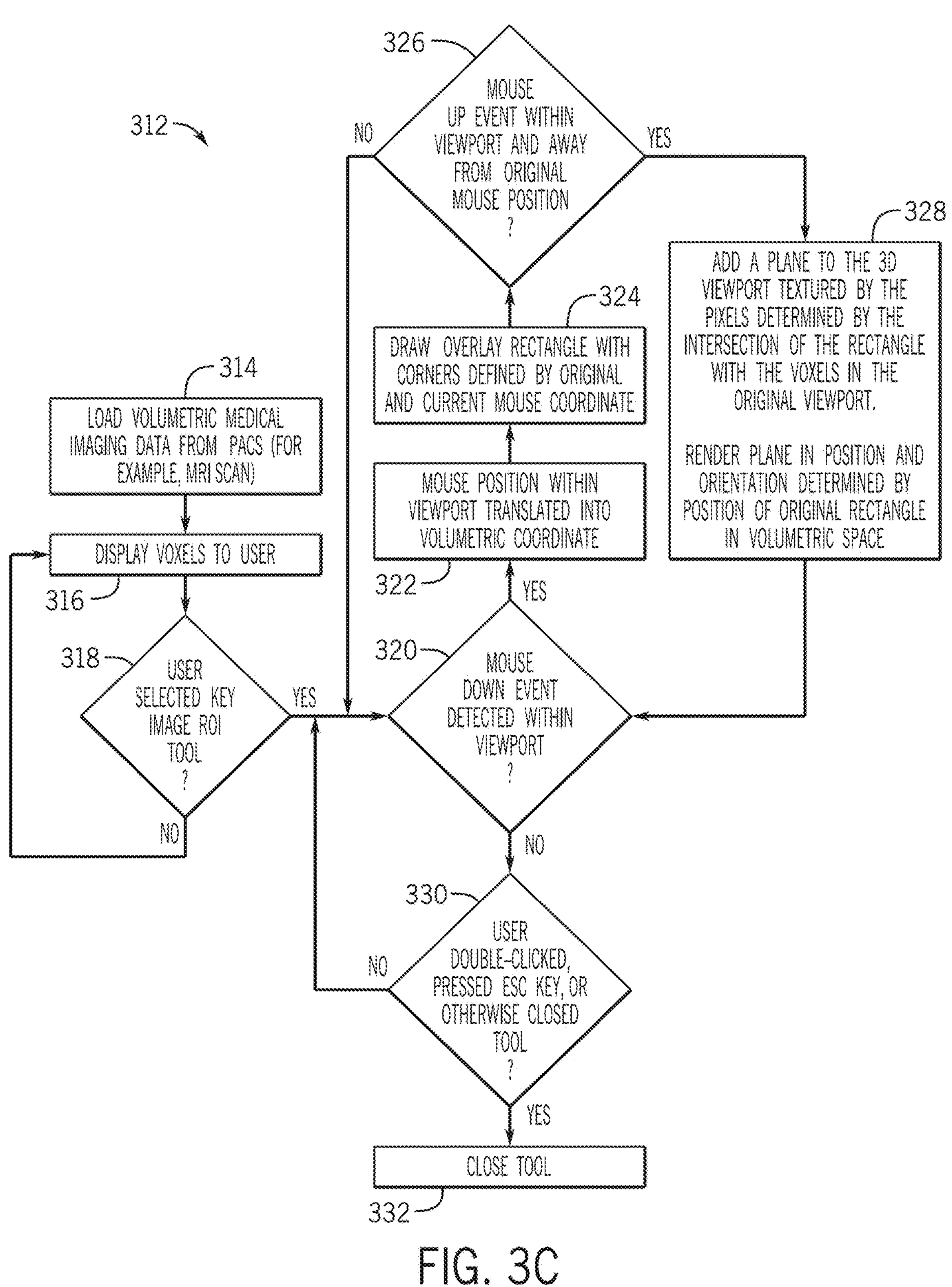
FIG. 3C is a flow chart illustrating a method of adding one or more planes to a visualization, in some implementations.

FIG. 3C is a flow chart illustrating a method 312 of adding one or more planes (e.g., planar regions) to a visualization, in some implementations. For example, the method 312 can be used to add planes to a visualization, as illustrated in FIGS. 3A and/or 3B.

The method 312 begins at block 314, where volumetric medical imaging data is loaded, received, and/or accessed by the system 102. The volumetric medical imaging data can be, for example, MRI data received from a PACS system.

The volumetric medical imaging data can comprise images and/or other data of one or more fistulae of a patient, such as MRI images of an anatomy of the patient where the one or more fistulae are present. In some implementations, the volumetric medical imaging data can include imaging of anorectal musculature.

The method 312 proceeds to block 316, where voxels are displayed to a user of the system 102 via a display. The voxels can comprise at least a portion of the volumetric medical imaging data loaded at block 314. For example, displayed voxels can comprise at least a portion of MRI images depicting the anatomy of the patient where the one or more fistulae are present, and the voxels can be displayed via a user interface provided by the system 102. In some implementations, the voxels include a model generated using the vEUA functionality of the system 102.

The method 312 proceeds to block 318, where the system 102 determines whether the user has selected a Key Image ROI tool provided by the system 102. The Key Image ROI tool can be selected in various ways, such as by selecting from a menu, clicking a visual element (e.g., button or icon), using a touch screen, using a gesture-based control, and so forth.

If, at block 318, the system 102 determines that the user has not selected the Key Image ROI tool, then the method 312 returns to block 316, where the voxels continue to be displayed to the user.

If, at block 318, the system 102 determines that the user has selected the Key Image ROI tool, then the method 312 proceeds to block 320, where the system 102 determines whether a mouse down event has been detected within a viewport of the user interface. The mouse down event can be, for example, one or more clicks and/or drags of a cursor. For example, the user may define a plane within an image by clicking at a first corner of the plane (e.g., a top left corner) and dragging to a location of a second corner of the plane (e.g., a bottom right corner), such that a rectangle is defined between the first corner and the second corner. Other mouse down events can also be used, such as defining locations based on touch screen interactions (e.g., touching and dragging one or more fingers across a touch screen to define a plane).

If, at block 320, a mouse down event is detected, then the method 312 proceeds to block 322, where a mouse position within the viewport is translated into a volumetric coordinate relative to the volumetric medical imaging data. In other words, a cursor location associated with the mouse down event detected at block 320 is translated to a volumetric coordinate to indicate a location relative to the volumetric medical imaging data displayed using the voxels.

The method proceeds to block 324, where an overlay rectangle is drawn with corners defined by an original mouse coordinate associated with the mouse down event detected at block 320 and a current mouse coordinate. For example, the user may click at a location of the original mouse coordinate to define a first corner of the overlay rectangle. The user may drag a cursor to the current mouse coordinate to define a second corner of the overlay rectangle (e.g., diagonally opposite the original mouse coordinate).

The method 312 proceeds to block 326, where the system 102 detects whether a mouse up event has occurred within the viewport and away from the original mouse coordinate. For example, the system 102 can detect that the user has released a mouse click at the current mouse coordinate, which is different from the original mouse coordinate.

If, at block 326, the system 102 determines that no mouse up event has occurred, then the method 312 returns to block 320 to monitor for a new mouse down event.

If, at block 326, the system 102 determines that a mouse up event has occurred, then the method 312 proceeds to block 328, where a plane is added to the viewport based on a rectangle defined by the original mouse coordinate and the current mouse coordinate. For example, the plane can be added to a 3D viewport and indicated using texturing or shading of pixels. The plane can be positioned based on a position and orientation determined by a position of the rectangle in volumetric space, such as volumetric space relative to the displayed voxels.

The method 312 returns to block 320 to continue to monitor for mouse down events.

Returning to block 320, if no mouse down event is detected, then the method 312 proceeds to block 330, where the system 102 determines whether a user closed the Key Image ROI tool, such as by clicking (e.g., double clicking or selecting an exit button or icon), pressing the escape key, or the like.

If, at block 330, the system 102 determines that the user has not closed the Key Image ROI tool, then the method 312 returns to block 320, where the system 102 continues to monitor for mouse down events.

If, at block 330, the system determines that the user has closed the Key Image ROI tool, then the method 312 proceeds to block 332, where the system 102 closes the tool.

In some implementations, the method 312 includes rendering a three-dimensional rendering of the volumetric data by rendering a subset of elements of the volumetric imaging data in three dimensions. The subset of elements can within a selected planar region. For example, the subset of elements can be a subset of voxels included within medical imaging data.

Although particular operations are illustrated in method 312, operations can be added to and/or removed from the illustrated method without deviating from the teachings of the present disclosure. Additionally, the depicted operations can be performed in a different order, including performing one or more operations in parallel.

Additionally, although particular operations for controlling the Key Image ROI tool are described, such as clicking to initiate certain operations, other operations for controlling the tool can be used. For example, the annotation tool can likewise be controlled using a touchscreen, gesture-based controls, menus, icons or other graphic elements, and so forth.

Figure 4:
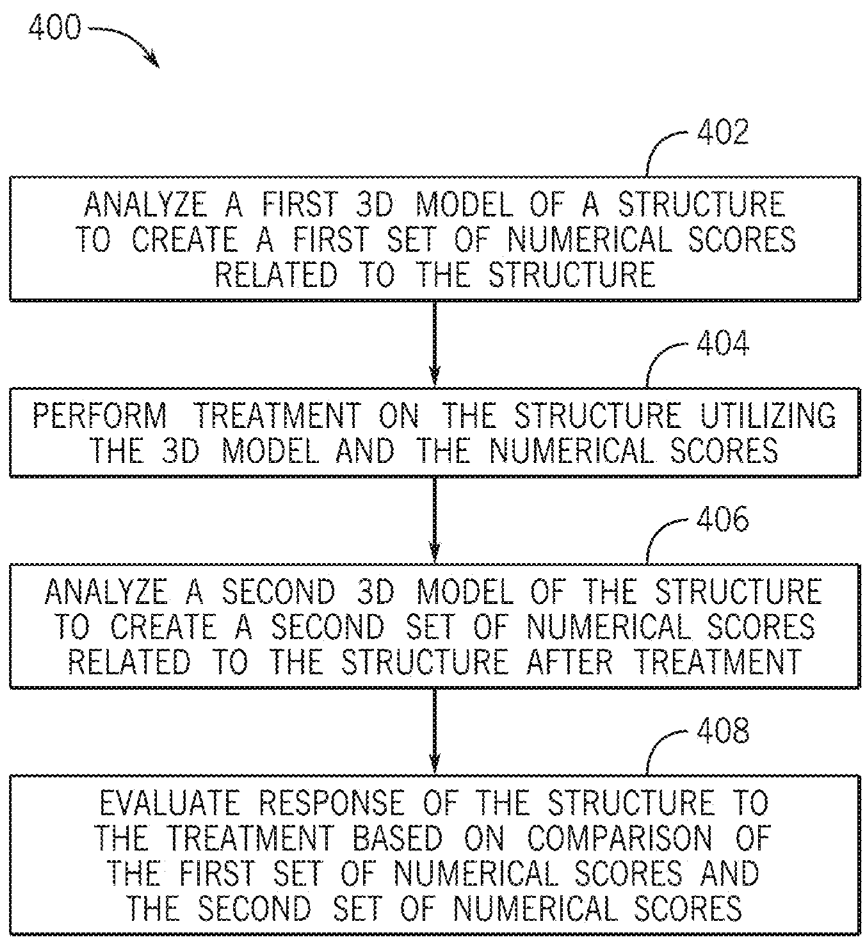
FIG. 4 is a flow chart illustrating a method of evaluating results of a treatment, in some implementations.

FIG. 4 is a flow chart illustrating a method 400 of evaluating results of a treatment, in some implementations. For example, the method 400 can be used to evaluate results of a treatment planned using the system 102 after the treatment has been performed.

The method 400 begins at block 402, where a first 3D model of a structure is analyzed to create a first set of numerical scores related to a structure. For example, where the first structure is a fistula, the first set of numerical scores may include a numeric grading, dimensions of the fistula, and measures of tortuosity, texture, and other characteristics of the fistula. In various examples, such numerical scores may be generated by the system 102 through interaction with the 3D model of the structure. For example, an operator may draw, on the 3D model, a line, spline, or other geometric shape, and the system 102 may obtain measurements of the shape, which may represent, for example, a length of the fistula. An operator may further be able to select areas of the 3D model, instruct the 102 to calculate specific metrics for the structure, and the like.

The method 400 proceeds to block 404, where treatment is performed using the 3D model and the numerical scores. For example, surgical treatment may utilize the 3D model to provide better visualization of a fistula and its interactions with other anatomical structures prior to a surgical procedure. The 3D model may also be utilized to visualize a patient's anatomy for drug delivery. In some examples, the 3D model and numerical scores may be utilized by a provider to determine appropriate treatment for a patient. For example, the numerical scores may aid the provider in determining whether a fistula or other structure is likely to respond to a selected treatment.

The method 400 proceeds to block 406, where a second 3D model of the structure is analyzed. The analysis of the second 3D model may produce a second set of numerical scores related to the structure after treatment. For example, the numerical scores may measure the same characteristics as the first set of numerical scores.

The method 400 proceeds to block 408, where the second set of numerical scores are compared to the first set of numerical scores to assist in evaluating response of the structure to the treatment provided at block 404. In various examples, the comparison of numerical scores may further assist a provider in planning further treatments.

Although particular operations are illustrated in method 400, operations can be added to and/or removed from the illustrated method without deviating from the teachings of the present disclosure. Additionally, the depicted operations can be performed in a different order, including performing one or more operations in parallel.

Figure 5A:
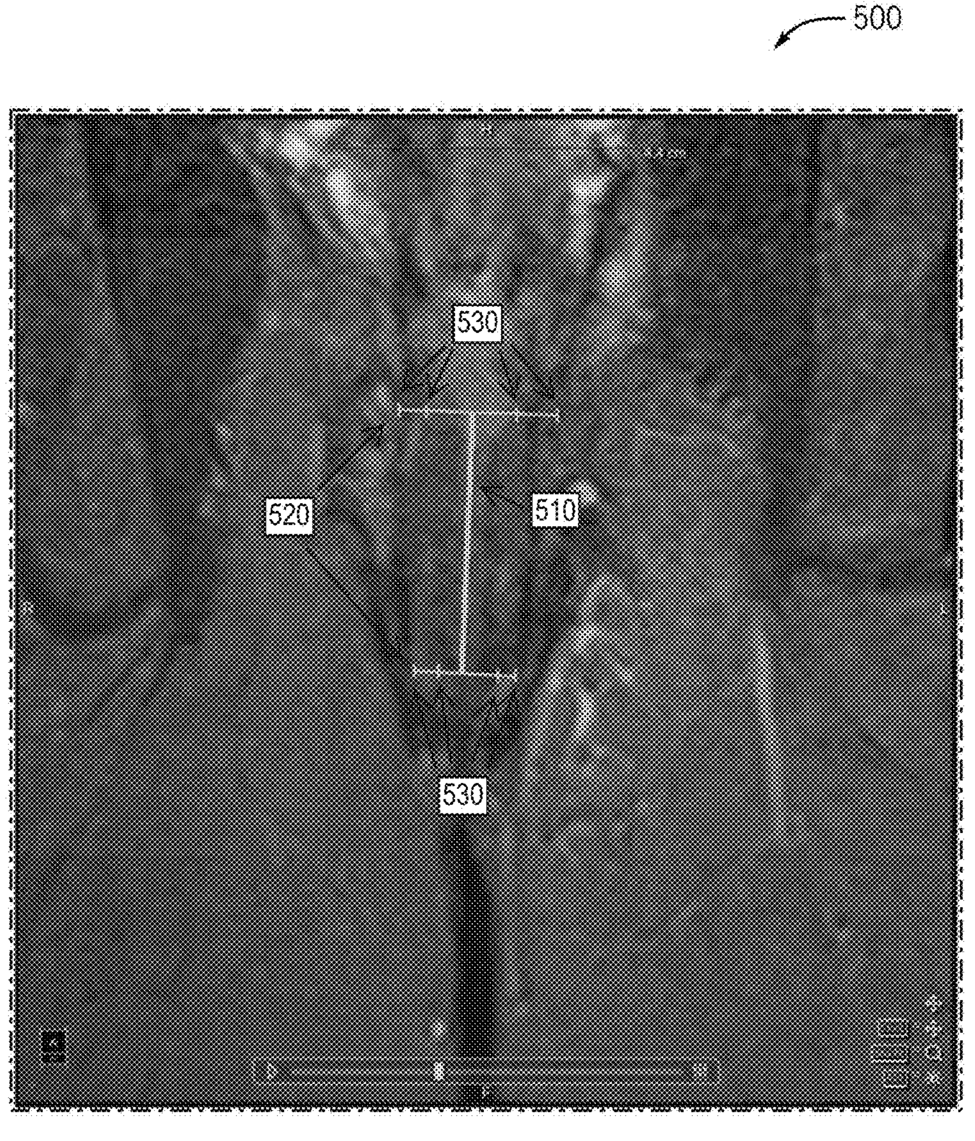
FIG. 5A illustrates an example user interface provided by the fistula analysis system, in some implementations.

FIG. 5A illustrates an example user interface 500 provided by the fistula analysis system 102, in some implementations. For example, the user interface 500 can be provided by the vEUA functionality of the system 102 to generate a model. As described herein, the vEUA functionality can generate a model of a patient anatomy using a set of landmarks, such as landmarks identifying a location and/or orientation of a levator plate and an anal canal included in medical imaging data. Accordingly, the system 102 provides one or more user interface, such as the user interface 500, to receive inputs (e.g., annotations) from a user to generate a model.

In the illustrated embodiment, the user interface 500 displays medical imaging data. For example, the user interface displays a coronal slice of MR imagery. The system 102 receives a user input via the user interface 500 to indicate a centerline through the anal canal. For example, the user can manipulate a graphical element 510 in the user interface 500 to indicate the location and/or orientation of the centerline. In some implementations, the graphical element includes T-bars 520, which can be adjusted such that they extend along the levator plate and approximate location of the anal verge. One or more ticks 530 of the T-bars may be adjusted to mark the approximate location of the inner and outer walls of the internal and external sphincter.

Figure 5B:
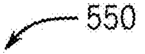
FIG. 5B illustrates an example user interface provided by the fistula analysis system, in some implementations.
Figure 5B:

FIG. 5B illustrates an example user interface 550 provided by the fistula analysis system 102, in some implementations. For example, the user interface 550 can be provided by the vEUA functionality of the system 102 to generate a model. Like the user interface 500 of FIG. 5A, the user interface 550 can be used to receive inputs (e.g., annotations) related to a set of landmarks for generating a model, such as a model of a patient anatomy based on landmarks identifying a location and/or orientation of a levator plate and an anal canal included in medical imaging data.

In the illustrated embodiment, the user interface 550 displays medical imaging data, such as MR imagery. The system 102 receives a user input via the user interface 550 comprising a polyline 560 indicating the location and/or orientation of on a coronal series from the top of the external sphincter on the levator plate. The user interface 550 can receive multiple inputs, such as a first input comprising a polyline 560 for a left side and a second input comprising a polyline 560 for a right side.

Figure 6:
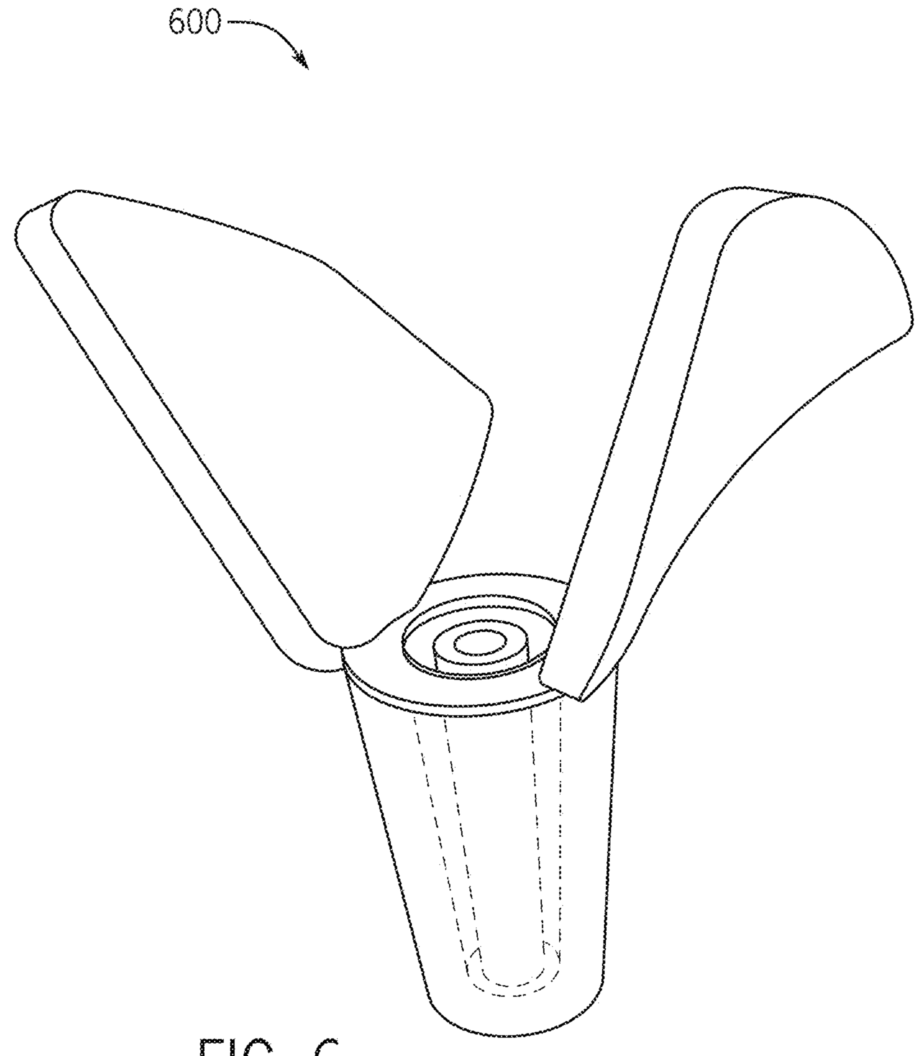
FIG. 6 illustrates an example model generated using the fistula analysis system, in some implementations.

FIG. 6 illustrates an example model 600 generated using the fistula analysis system 102, in some implementations. For example, the model 600 can be generated using annotations or inputs, such as the inputs provided via the user interface 500 of FIG. 5A and the user interface 550 of FIG. 5B. Based on these inputs, the model 600 can be generated to indicate a shape, size, orientation, and the like for an anatomy of a patient. In the illustrated embodiment, the model 600 represents at least a portion of an anal canal and a levator plate, based on received inputs including a centerline of an anal canal, a location and orientation of a levator plate and an anal verge, and a location of inner and outer walls of an internal and external sphincter. In some implementations, the model 600 is color coded to indicate different portions of the anatomy, such as using different colors to indicate an anal canal and a levator plate. The model 600 can be a three-dimensional model.

Once the model 600 has been generated, it can be used to evaluate the anatomy, plan treatments associated with the anatomy, assess a condition of a patient, and so forth. For example, abscesses and/or fistulae can then be marked using, for example, a brush segmentation tool, which allows regions of pixels to be added to a 3D representation of the abscess/fistula on a slice-by-slice basis, and the abscesses and/or fistulae can be rendered in situ in the model 600. Additionally or alternatively, one or more annotations can be generated for the model 600 using the fistula annotation system. Advantageously, the model is sufficiently complex or detailed to enable treatment planning and disease state monitoring, while also being simplified, such that it can be generated quickly (e.g., in seconds or minutes) without using excessive computing resources. The model can also be updated after examination to detail the positioning of seton or other elements to inform follow up.

Figure 7:
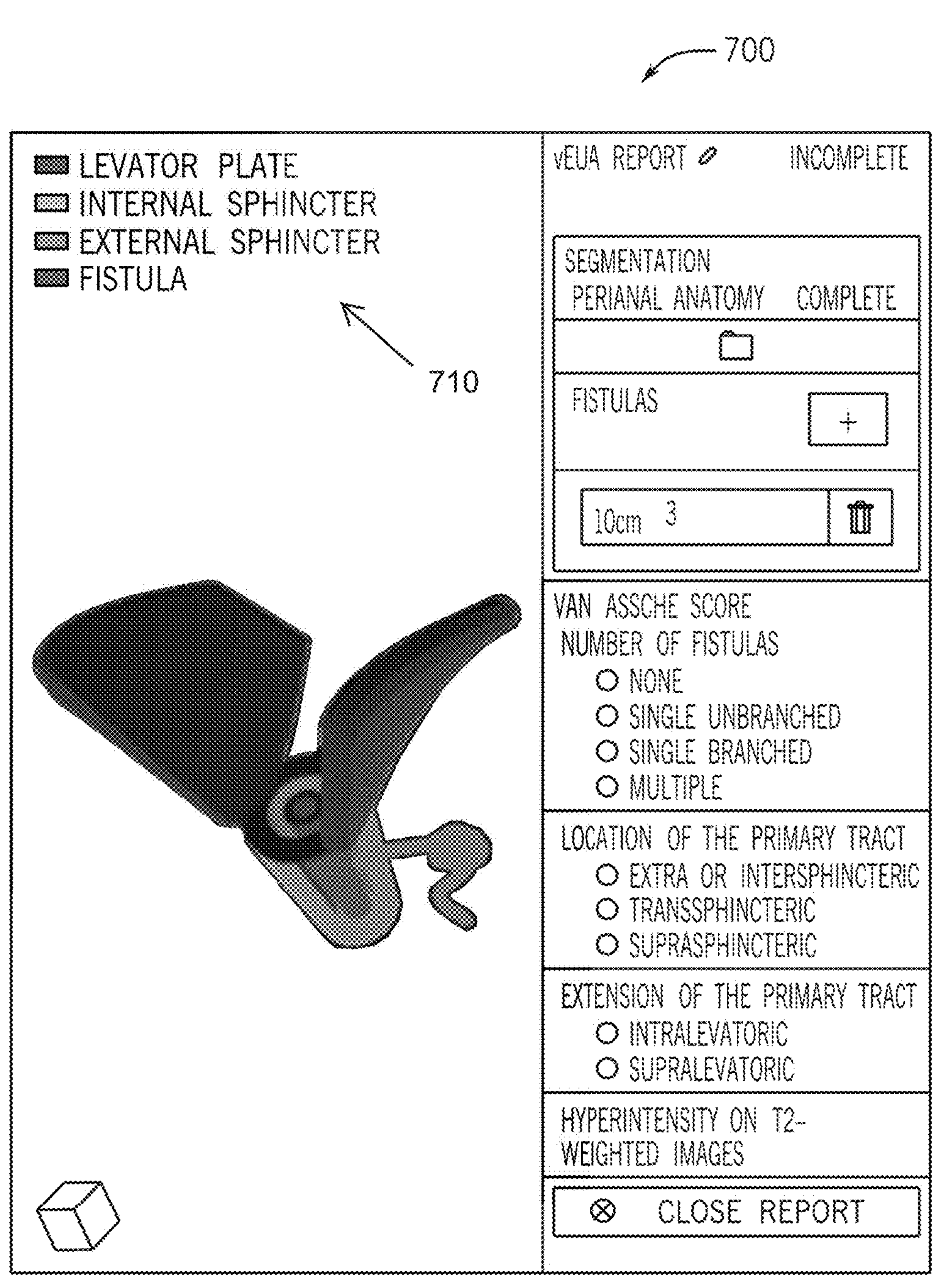
FIG. 7 illustrates an example user interface for displaying a model generated using the fistula analysis system, in some implementations.

FIG. 7 illustrates an example user interface 700 for displaying a model generated using the fistula analysis system 102, in some implementations. For example, the user interface 700 can display the model 600 illustrated in FIG. 6. The user interface 700 includes a key 710, which can be color coded to describe or characterize the model. For example, the key 710 can indicate portions of the model representing a levator plate, an internal sphincter, an external sphincter, and a fistula. As described herein, the system 102 can display abscesses, fistulae, and/or other features in situ on a model. Accordingly, models generated using the system can improve technologies for communication of a patient condition between treatment providers and/or others because the generated models help to ensure that different treatment providers have the same understanding of a patient's anatomy and condition. Additionally, the generated models can be used to determine various information about the patient's anatomy and condition, such as numerical values associated with characteristics of the anatomy or condition. For example, numerical values can be extracted from a generated model to track disease progression, evaluate treatment effectiveness, and so forth.

Various metrics or data can be generated using the model, and the model, metrics, data, and other information can be included in various reports and/or displayed to a user. For example, the model can be used to generate calculated scores, such as a Van Assche Score, and/or objective measurements, such as dimensions of portions of the anatomy represented by the model. Additionally, data associated with the model can indicate characteristics of portions of the anatomy, such as characteristics of particular tracts.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of generating a virtual model, the method comprising:

receiving, at a virtual examination system, a plurality of images of a patient collected using magnetic resonance (MR) imaging;

receiving, at the virtual examination system, a first input identifying a first structure shown in the plurality of images of the patient;

receiving, at the virtual examination system, a second input identifying a second structure shown in the plurality of images of the patient; and generating, using the first input and the second input, a virtual model of the first structure and the second structure of the patient for use in treating a disease state of the patient, wherein the disease state is a perianal fistula, and wherein the first structure is an anal canal of the patient and the second structure is a levator plate of the patient.

2. The method of claim 1, further comprising:

receiving a third input identifying a third structure shown in the plurality of images of the patient, the third structure comprising a skin surface of the patient; and receiving a fourth input identifying a fourth structure shown in the plurality of images of the patient, the fourth structure comprising a fistula tract.

3. The method of claim 1, wherein the first input includes a centerline drawn through at least a portion of the anal canal of the patient on at least one of the plurality of the images.

4. The method of claim 1, wherein the second input includes a polyline drawn from the top of an external sphincter along the levator plate of the patient on at least one of the plurality of the images.

5. The method of claim 2, wherein the third input includes a line drawn on at least one of the plurality of the images to identify the skin surface of the patient.

6. The method of claim 1 wherein the first input and the second input are received from a first user device, the method further comprising:

accessing, at a second user device, the virtual model; and generating a visualization using the virtual model of one or more forks in the perianal fistula, wherein the visualization is generated to provide context for a user to perform a procedure to treat the perianal fistula.

7. The method of claim 1, further comprising:

evaluating a treatment of the disease state of the patient by:

determining at least one initial measurement using the virtual model, wherein the virtual model is generated before the treatment; and comparing the at least one initial measurement to at least one additional measurement, wherein the at least one additional measurement is determined using a second virtual model generated subsequent to the treatment.

8. The method of claim 1, further comprising:

causing display of the virtual model in a user interface, wherein the user interface allows a user to manipulate the virtual model to view the first structure and the second structure from a plurality of angles.

9. The method of claim 1, further comprising:

receiving a markup of the virtual model at a first user device, the markup including an indication of at least one feature of interest; and causing display of the markup of the virtual model at a second user device.

* * * * *